(No Model.) 2 Sheets—Sheet 1.
J. VOWLES.
WHEEL HARROW AND CULTIVATOR.
No. 302,216. Patented July 15, 1884.
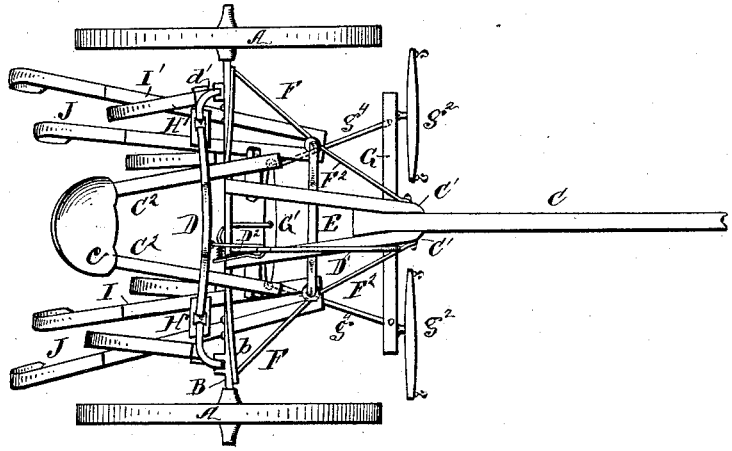
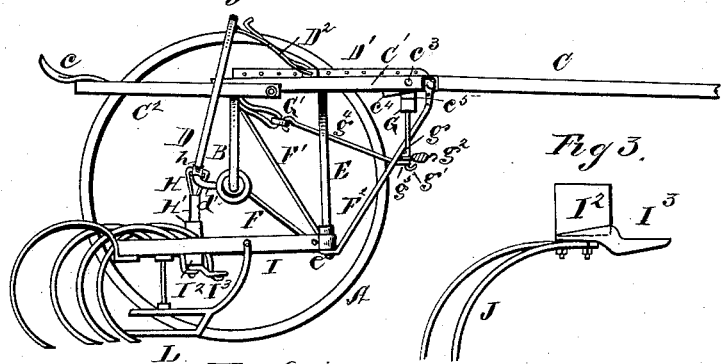
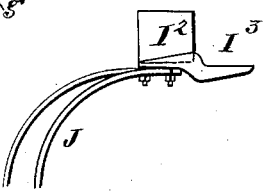
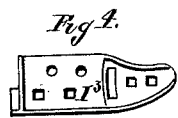
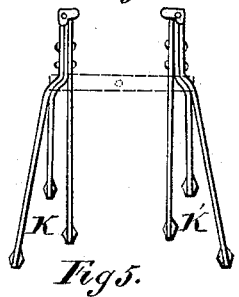
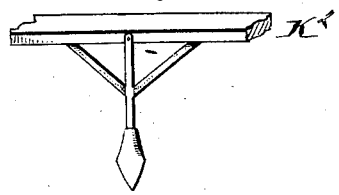
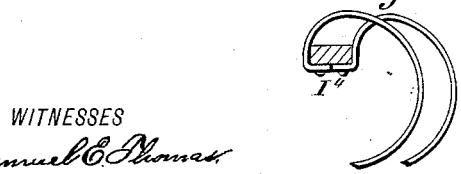
WITNESSES
Samuel E. Thomas
N S Wright
INVENTOR
Joseph Vowles
By W. W. Leggett.
Attorney (No Model.) 2 Sheets—Sheet 2.

J. VOWLES.
WHEEL HARROW AND CULTIVATOR.

No. 302,216. Patented July 15, 1884.

WITNESSES
Samuel E. Thomas,
N. S. Wright.

INVENTOR
Joseph Vowles
By W. W. Seggern
Attorney

UNITED STATES PATENT OFFICE.

JOSEPH VOWLES, OF MILFORD, MICHIGAN, ASSIGNOR OF ONE-HALF TO AMBROSE C. ORVIS, OF SAME PLACE.

WHEEL HARROW AND CULTIVATOR.

SPECIFICATION forming part of Letters Patent No. 302,216, dated July 15, 1884.

Application filed August 30, 1883. (No model.)

*To all whom it may concern:*

Be it known that I, JOSEPH VOWLES, of Milford, county of Oakland, State of Michigan, have invented a new and useful Improvement in Wheel Harrows and Cultivators; and I declare the following to be a full, clear, and exact description of the same, such as will enable others skilled in the art to which it pertains to make and use it, reference being had to the accompanying drawings, which form a part of this specification.

My invention consists in the combinations of devices and appliances hereinafter specified, and more particularly pointed out in the claims.

Figure 8:
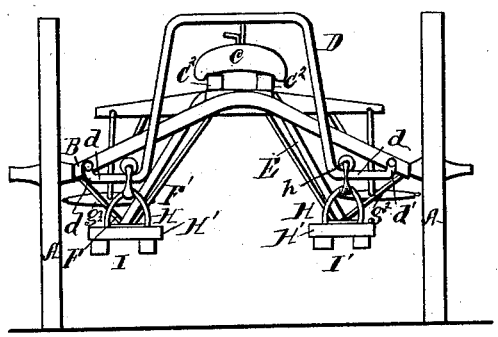
Figure 9:
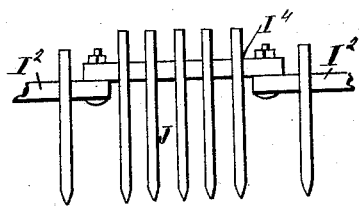
Figure 10:
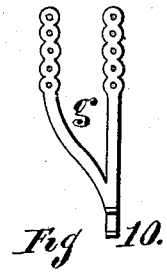

In the drawings, Figure 1 is a plan view of a device embodying my invention. Fig. 2 is a side elevation. Fig. 3 is a modification of one of the parts. Fig. 4 is a separate view of the shoe. Fig. 5 is a detail view of the removable tooth-bearing bar. Fig. 6 is a plan view of a modification of the frame and teeth secured thereto. Fig. 7 is a separate view of a modification of the removable tooth-bearing bar. Fig. 8 is a rear elevation. Fig. 9 illustrates how the removable tooth-bearing bar is secured in place. Fig. 10 is a separate view of the bracket by which the whiffletrees are attached.

A represents the wheels, and B any suitable axle, preferably curved or arched, as shown.

C is the tongue.

C' represents the side bars or hounds. These hounds may be extended so as to form the tongue, if desired.

$C^2$ are the arms which bear the seat $c$, said arms being secured to the middle part of the axle by means of a saddle-piece or otherwise. The lever D, for adjusting the teeth more or less into the soil, is curved outward at its lower portions to form lateral arms $d'$ $d'$, which stand substantially at right angles to the tongue C; such arms being bent inward toward the axle, and are flexibly jointed directly to the latter adjacent to the wheel-hubs, whereby the arched lever can be swung forward or backward. The jointed connection, as here shown, consists of ears rigid on the axle, between which the extremities of the arched lever are pivoted by suitable pins, as in Fig. 2, and by the direct connection of the extremities of the lever to the axle the structure is rendered simple, and the toothed frames are connected with the lever between its outer or free portion and its pivotal attachment to the axle.

D' is a ratchet-bar secured upon one of the side bars of the tongue longitudinally therewith.

$D^2$ is a sliding bar secured by a joint at one end to the upper portion of the arched lever D, provided at its opposite end with a loop adapted to slide upon the bar D'. This sliding bar is provided with a ratchet mechanism adapted to engage through the loop with the ratchet-bar D'. As shown in the drawings, the lever D is located in front of the seat, the arch of the lever being astride the arms $C^2$. In this position the driver can readily operate the ratchet mechanism and throw the sliding bar, with the arched lever, forward or backward, as may be required, and securely hold it in any desired angle. The ratchet mechanism engaging with the bar D' allows a very fine regulation of the teeth in the soil. Should it be desired to let the lever work freely, so as to adapt itself readily to unevenness of soil—as in crossing dead-furrows, for instance—the ratchet mechanism is constructed so that the engaging end may be readily disengaged from the slots in the sliding loop and be caused to ride upon the outer surface of said loop, in which location the sliding bar and arched lever ride upon the ratchet-bar at will until it is desired to re-engage the ratchet with the ratchet-bar, when it can be readily thrown back into the slot of the loop. It will be seen that at whatever angle the lever may be turned the arm $d$ will always be parallel with the ground.

E is a front arch or bridge, secured underneath the bars C', its arms projecting downward and provided at their respective ends with a hinge and swivel-joint, $e$, adapted to give a sidewise motion to the wings of the cultivator, and also permitting said wings to be raised and lowered at the rear end.

F represents draw-bars connected with the lower ends of the arch E and the ends of the axle B.

F' are rear draft-braces, connected with the lower ends of the arch E and the middle of the axle.

F² are front draft-braces, connected with the hinge and swivel joint on the arch E, and projecting forward and upward to the tongue or hounds, with which they are also connected. The bars F, running from the shoulder of the axle to the front arch, E, serve to hold the wheels steady. The rear draft-braces, F', prevent the ends of the arch E from crowding in, while the front braces, F², serve to prevent their crowding out, and vice versa, the one set of braces F' F² preventing the natural effect of the one without the other, the whole construction making a strong frame.

In order to secure a proper adjustment of the tongue so as to bring the front and rear teeth equally into the earth, and provide for different depths of cut by loosening the bolt $c^3$, which secures the forward ends of the bars C' to the tongue, the tongue may be tilted as desired, and secured in place by a wedge or wedges, $c^4$, resting upon the under serrated plate $c^5$, upon the evener G. By thrusting the wedge farther forward the teeth are adjusted for shallower depths of cut. By removing the wedge farther back they are adjusted to cut deeper. By this means the proper angle of the teeth is readily secured. Instead of adjusting the tongue by means of the wedge, the adjustment may be provided for by any suitable means—as, for instance, by constructing the ends of the front draft-braces, F², with an upwardly-projecting arm at the upper end, said arm provided with slots for sockets, whereby the sections of the cultivator-frame may be raised and lowered, and the tongue adjusted in relation thereto as may be desired.

G is a front evener or bracket, suspended to the under side of the tongue by a swiveled connection at its center upon a plate secured underneath the hounds.

$g$ represents suitable brackets projecting downward from the ends of said evener, each terminating in a hook, $g'$, or other suitable device, on which the whiffletrees $g^2$ are hung. These arms may be constructed of suitable rods rigidly or adjustably secured to the ends of the evener G. The bracket may be constructed with its upper ends perforated, as shown in Fig. 10, so as to be adjustable upon the evener G, in order that the whiffletrees may be adjusted up or down, as may be desired.

G' is a rear evener, hinged or pivoted to the middle of the axle in any proper manner, and provided with the rods $g^4$, each terminating in an eye at $g^5$, adapted to be engaged upon the hooks $g'$ of the bracket after the whiffletree is hung therein, securing the same upon the hook, the rods thus being removable, so as to permit the disengagement of the whiffletrees. The two eveners G and G', with their attachments, constitute an efficient draft-equalizer. The evener G, with its pendent brackets $g$, serves as a bracket to support the tongue, and keeps the whiffletrees in the desired position.

H represents stirrups, each having a pulley, $h$, and secured upon the arms $d$ of the lever D in such a manner that they may traverse said arms back and forth freely to the right and left. The stirrups may be omitted, if desired, as the sections of the harrow may be caused to traverse to the right and left upon the arm of the arched lever in any proper manner.

H' is a suitable brace under the stirrup to which it is attached.

I and I' represent the beams of a harrow or cultivator. These beams are preferably arranged in two wings, as shown in the drawings, each united by cross-beams I², and at their forward ends connected with the hinge and swivel joint at $e'$ upon the arms of the front arch, E.

J represents spring-teeth, of any desired number, suitably arranged upon the beams and cross-beams.

I³ is a shoe secured upon the end of the cross-beam, (more particularly shown in Fig. 2,) the side of the shoe preferably extended beyond the end of said beam, the construction of the shoe being such that two spring-teeth may be secured upon the rear of the plate, one a trifle in advance of the other. When the teeth are thus arranged they will be adapted for hilling. The shoe is also constructed in such a manner that one of the teeth may be secured upon its forward end to project farther forward than in the location just described. By this means one of the teeth may be adjusted to occupy either of the two positions mentioned, by which the device is adapted either for pulverizing the soil or for hilling, as may be desired. The two methods of securing the teeth are illustrated in Figs. 3 and 5. The device as thus arranged is adapted for a corn-cultivator, and is so constructed that the driver, with his feet in the stirrups, can move the wings, with their teeth, either nearer to or farther from the row, said beams working right or left by means of the swivel-joint $e$.

In Fig. 5 is shown a tooth-bearing bar, I⁴, upon which a desired number of teeth are suitably arranged. This bar is adapted to be inserted between the wings I and I', and to be rigidly secured in place in any proper manner, the implement being thus extended to cut the full width of the wheels.

As so constructed the device is adapted for a harrow. I prefer to so arrange the teeth upon the beams that their points shall not be upon a straight line across the harrow, in order that they may be less likely to clog.

It is evident that the main frame-work already described is equally well adapted for its purpose, whether an arrangement of spring-teeth be attached by wings to the swivel-joint $e$ and to the brace H' under the stirrup, or whether an arrangement consisting of other forms of teeth be suitably attached by a frame to the swivel-joint $e$ and upon the brace H', should it be found desirable. Accordingly Fig. 6 shows a variation where the beams K K' are provided with shovel-teeth in any desired number. Said beams are preferably arranged in two wings, three beams upon a side, the center beam shorter than the others, all suitably secured together at their front, and provided with means for connection with the swivel-joint $e$ and the brace H'.

As thus constructed the device is adapted for a corn-cultivator. Each side may be guided to and from the row by the driver by means of the stirrups, and the teeth given any required angle by means of the arched lever D, as before. Suitable guards or fenders, L, may also be pivoted to the front ends of each wing, so as to rise and fall on the inside of the wings and afford protection to the corn. This form of the device may be also transformed into a harrow by means of a bar, $K^2$, (shown in Fig. 7,) provided with a central tooth, said bar adapted to be secured between the two wings in any suitable manner.

It is observed that by disconnecting one form of the above devices from the swivel-joint $e'$ and the braces H', the other form of device may be secured to the same upper frame-work by the same joint and braces, the whole construction forming a combined harrow and cultivator.

What I claim is—

1. The combination of the arch E, cultivator-frames connected at their forward ends to said arch by hinge and swivel joints, the axle B, the arched lever D, having its extremities hinged directly to the axle, and constructed with horizontal arms $d$, and mechanism supporting the rear ends of said frames upon said arms of the lever, by which the operator may at will cause the rear of the frames to travel laterally on said arms, substantially as described.

2. In a riding-cultivator, the combination, with the arch E, of cultivator-frames connected therewith by hinge and swivel joints, an arched lever, D, having lateral horizontal arms $d$, and jointed at its extremities directly to the axle, mechanism supporting the rear of said frames upon said lateral arms, by which the operator may at will cause said rear ends of the frame to travel laterally upon said arms, and, in connection therewith, mechanism for holding the arched lever in any desired position, for controlling the vertical position of the rear ends of the frames, substantially as described.

3. In a riding-cultivator, the combination of the arch E, cultivator-frames connected therewith by hinge and swivel joints, an arched lever, D, having lateral horizontal arms $d$, and curved at its extremities at right angles to said arms, said lever extending over in front of the driver's seat, and jointed at its extremities directly to the axle, the rear ends of said frames supported upon the arms $d$ of said lever by a stirrup, a roller by which the operator may vibrate the rear ends of said frames laterally at will, and, in addition thereto, mechanism for holding said lever in any given position to control the vertical movement of said frames, substantially as described.

4. The combination of the hound C', the tongue C, the arch E, the axle B, the arched lever D, provided with lateral arms $d$, and jointed at its extremities directly to the axle, cultivator-frames connected with the extremities of the arch E by a joint, permitting the rear ends of said frames to rise and fall and swing laterally, the rear of said frames supported upon the lateral arms of the arched lever by mechanism enabling the operator at will to cause the rear ends of said frames to swing laterally, ratchet mechanism connected with the tongue and the arched lever, to hold said lever in any desired position, and, in connection therewith, means for tilting the tongue to any desired angle, substantially as described.

5. The combination of the hounds C', the tongue C, the arch E, the axle B, the cultivator-frames having their forward ends swiveled to the arch, the arched lever D, having its extremities hinged directly to the axle, the rear oblique braces, F', connected with the lower ends of the arch and centrally with the axle, the front oblique draft-braces, $F^2$, connected with the lower ends of the arch and with the tongue, and the oblique draw-bars F, connecting the lower ends of the arch with the ends of the axle, substantially as and for the purpose described.

6. The combination, with the frame, the axle B, the arch E, the toothed frames swiveled to the arch, and the tongue having a ratchet-bar, of the arched lever D, having its extremities jointed directly to the axle, a sliding bar connected with the lever and adapted to slide on said ratchet-bar, and means for engaging said sliding bar with the ratchet-bar, substantially as described.

7. The combination, with the arch E and axle B, of the arched lever D, having lateral arms $d$, and jointed at its extremities directly to the axle, the stirrups H, suspended from and adapted to travel to and fro on said arms, and toothed wings swiveled to the lower ends of the arch and connected with the said stirrups, substantially as described.

8. The combination, with a tooth-carrying beam, of a shoe, $I^3$, secured thereto, and two spring-teeth attached to the shoe, one in advance of the other, substantially as described.

In testimony whereof I sign this specification in the presence of two witnesses.

JOSEPH VOWLES.

Witnesses:
S. H. WILHELM,
FRANK A. ORVIS.